United States Patent [19]

Hagiwara et al.

[11] Patent Number: 5,445,839
[45] Date of Patent: Aug. 29, 1995

[54] POWDERS OF PLANT GREEN JUICE AND PROCESS FOR THEIR PRODUCTION

[75] Inventors: Yoshihide Hagiwara; Hideaki Hagiwara, both of Takarazuka, Japan

[73] Assignee: Japan Natural Food Co., Ltd., Osaka, Japan

[21] Appl. No.: 83,871

[22] Filed: Jun. 30, 1993

Related U.S. Application Data

[63] Continuation of Ser. No. 676,336, Mar. 28, 1991, abandoned.

[51] Int. Cl.⁶ .............................................. A23B 7/02
[52] U.S. Cl. ..................................... 426/270; 426/471; 426/640
[58] Field of Search ............... 426/262, 267, 270, 471, 426/640

[56] References Cited

U.S. PATENT DOCUMENTS

| | | | |
|---|---|---|---|
| 1,594,804 | 8/1926 | Welch | 426/471 |
| 2,186,003 | 1/1940 | Blair | 426/270 |
| 2,189,774 | 2/1940 | Blair | 426/270 |
| 2,509,719 | 5/1950 | Berdseye | 426/640 |
| 2,959,486 | 11/1960 | Strashun et al. | 426/471 |
| 3,787,591 | 1/1974 | Hagiwara | 426/640 |
| 4,762,724 | 8/1988 | Staker | 426/640 |
| 4,915,961 | 4/1990 | Tanaka | 426/640 |
| 5,094,860 | 3/1992 | Newhall | 426/640 |
| 5,124,171 | 6/1992 | Devic | 426/640 |
| 5,298,265 | 3/1992 | Poulose | 426/640 |

FOREIGN PATENT DOCUMENTS

| | | | |
|---|---|---|---|
| 964195 | 3/1975 | Canada | 426/640 |
| 3617771 | 10/1971 | Japan . | |
| 3854871 | 11/1971 | Japan . | |
| 4117771 | 12/1971 | Japan . | |
| 1222762 | 9/1989 | Japan . | |
| 1-281066 | 11/1989 | Japan . | |
| 1358052 | 6/1974 | United Kingdom . | |

OTHER PUBLICATIONS

WPI Sect. Ch, Wk 8222, Derwent Publ. London, GB; Class D, AN 82-45184E & JP-A-51 121 563 (Y. Hagiwara) 24 Jan. 1976, abstract.
WPI Sect. Ch, Wk 8522, Derwent Publ. London, GB; Class D, AN 85-130805 & JP-A-60 006 951 (Minato Seiyaku) 17 Apr. 1985, abstract.
WPI Sect. Ch, Wk 8341, Derwent Publ. London, GB; Class D, AN 83-78355 & JP-A-58 146 255 (Nikken Food) 31 Aug. 1983, abstract.
WPI Sect. Ch, Wk 7946, Derwent Publ. London, GB; Class B, AN 79-83339B & JP-A-54 129 111 (Y. Hagiwara) 6 Oct. 1979, abstract.
Patent Abstracts of Japan, vol. 9, No. 91 (C-277) 19 Apr. 1985 & JP-A-59 224 674 (Kagome) 17 Dec. 1984 abstract.
Patent Abstracts of Japan, vol. 7, No. 263 (C-196) 24 Nov. 1983 & JP-A-58 146 255 (Ochi Hirotomo) 31 Aug. 1983, abstract.
WPI Sect. Ch, Wk 7145, Derwent Publ. London, GB; Class B, AN 71-72318S & JP-B-46 038 548 (Y. Ogihara) abstract.

*Primary Examiner*—Carolyn Paden
*Attorney, Agent, or Firm*—Sherman and Shalloway

[57] ABSTRACT

Powders of plant green juice having an improved stability and tastiness which are storable for a long period of time, characterized in that said powders comprise:
 (a) dry powders of the plant green juice obtained by squeezing fresh raw edible green plants and
 (b) a water-soluble alkaline naturally occurring mineral mixture dispersed uniformly in said dry powder, and the pH of a dispersion at the time of dispersing in water falls into a range of 6.2–9.5. The powders can be produced by adding a water-soluble alkaline naturally occurring mineral mixture to a plant green juice obtained by squeezing fresh raw edible green plants thereby to adjust the pH of said plant green juice to be a range of 6–9 and then spray-drying or lyophilizing the green juice.

7 Claims, No Drawings

POWDERS OF PLANT GREEN JUICE AND PROCESS FOR THEIR PRODUCTION

This application is a continuation of application of application Ser. No. 07/676,336, filed Mar. 28, 1991, now abandoned.

BACKGROUND OF THE INVENTION

1. Field of the Invention

This invention relates to powders of plant green juice. More specifically, the invention relates to powders of plant green juice having an improved tastiness which are storable for long and a process for their production.

2. Description of the Related Art

If drying green leaves of any plant usually, this involves such phenomenon that generally the leaves are discolored into yellow or turn brown, etc. Further, it is well known that even if the leaves keep their green color for a short period of time after the production of powders, its dried product loses a green color during storage and involves a change such as browning, degeneration or a change in smell.

The Inventors have hitherto made research works on the powderization of a plant green juice obtained by squeezing any plant having green leaves, its stabilization, its long-term storage method, etc. Its outcomes are reported in a process for producing powders of plant green juice taste having an improved drinkability (Japanese Patent Publication No. 46-36177), a process for producing powders of green leaves of barley and wheat (Japanese Patent Publication No. 46-38548), a process for producing powders of plant green juice (Japanese Patent Publication No. 46-41177) and other numerous scientific literatures.

The green color of green leaves and green plants is chlorophyll. It is also known that chlorophyll is converted into colorless phaeophytin by suffering from an action of ultraviolet rays, an acid, an enzyme (chlorophyllase), etc., in consequence of which a brown color and a red color of xanthophyll, carotenoid, flavonoid pigment and the like become notable.

In the above Japanese Patent Publn. No. 46-38548, etc. the Inventors have proposed a process for producing powders of plant green juice which are free from any unpleasant smell and which may be stored stably for a long period of time by adjusting the pH of the plant green juice obtainable by mechanicallly squeezing green leaves of barley and wheat or green plants to form plant green juice, adjusting the pH of the green juice to be 6-9, with an alkaline substance such as carbonate, bicarbonate or hydroxide of an alkali metal or an alkaline earth metal like sodium carbonate, potassium carbonate, sodium bicarbonate, caustic potash, ammonium hydroxide or magnesium hydroxide and then spray drying or lyophilizing the obtained green juice.

The powders of the plant green juice produced by the above proposed processes can be stored for a relatively long period of time, usually one to two years without causing the green color of the raw green juice to discolor or fade. However, nobody could settle defects as foodstuffs that acid components (various organic acids and an amino acid) contained in the green juice were neutralized by adding the above alkaline substance, thereby to cause a change in the inherent flavor of the green juice in combination with the taste of said alkaline substance per se and to degrade the tastiness of powders of the green juice. Moreover, it has been clarified by subsequent long-term research works that at the time of adding the above alkaline substance the following phenomena are promoted thereby to darken a green color of the green juice and degrade the brightness of a fresh, vivid green color inherent to the juice, i.e. alkali metal chlorination or alkaline earth metal chlorination of chlorophyll contained in the green juice, saponification of fatty acid ester, reddish browning of flavonoid type pigments, etc.

SUMMARY OF THE INVENTION

The Inventors made their ardent research works with a view to overcoming the above difficulties involved at the time of adjusting the pH of the plant green juice with the above alkaline substance. As a result, they discovered that if making the pH adjustment of the plant green juice with a water-soluble alkaline naturally occurring mineral mixture obtained from an ashed product of any animal, plant or seaweeds, unexpectedly not only the above defect could be solved but also there were obtainable stable and long-term storable powders of the plant green juice which flavor and taste were increased notably and which were excellent in the tastiness. This discovery led to the completion of the present invention.

Thus, the present invention is to provide powders of plant green juice having an improved stability and tastiness which are storable for a long period of time, characterized in that said powders comprise:

(a) dry powders of the plant green juice obtained by squeezing fresh raw green edible plants and
(b) an alkaline naturally occurring mineral mixture dispersed uniformly in said dry powder, and the pH of the dispersion at the time of dispersing it in water falls into a range of 6 to 9.5.

Further, the invention is to provide a process for the production of powders of plant green juice having an improved stability and tastiness which are storable for a long period of time, characterized in that a water-soluble alkaline naturally occurring mineral mixture is added to the plant green juice obtainable by squeezing fresh raw green edible plants thereby to adjust the pH of said plant green juice to be a range of 6–9.5 and then spray-drying or lyophilizing the neutralized green juice.

DESCRIPTION OF THE PREFERRED EMBODIMENT(S)

In the following paragraph the present invention will be explained in more detail.

The green edible plants which become an object of treatment in the invention include not only grown edible plants having green leaves or stems (hereinafter referred to as "leaves and stems") but also edible wild herbs and medicinal plant having green leaves and stems; plants such as fruit vegetables, edible roots, cereals or fruits having leaves and stems which are not usually eaten; green edible seaweeds; etc. Their specific examples may include green leaves of barley and wheat, spinach, lettuce, cabbage, Chinese cabbage, potherb musturd, cucumber, balsam pear, green pepper, green leaves of carrot, green leaves of raddish, parsley, celery, Angelica keiskei Koidz, confree leaves, green leaves of forage grass such as alfalfa, clover or kale, leaves of low striped bamboo, leaves of persimmons, leaves of pine tree, spirulina, chlorella. These plants can be used singly or may be used in combination of two kinds or more. Above all, are suitable green leaves (green stems and leaves) of wheat and barley, especially wheat and barley during or before the full head stage, preferably wheat and barley during or before the heading initiation stage, more preferably wheat and barley in the tillering stage to the head stage, such as green leaves of barley, wheat, naked barley, oat, Italian rye grass, etc. Further, green leaves of the barley in the above stage are optimum.

These wheat and barley can be used singly and can be also used in combination with the above-mentioned other green plants as required.

It is desired that these green plants should be treated while they are as fresh as possible. Further, where using stored leaves, it is desirable to employ those which should be subjected to discoloration and degeneration preventing means such as storage in inert gas, storage at low temperatures, storage after dehydration at reduced pressure or storage after treatment with sulfurous acid gas or sulfite. The green leaves employed as raw material are thoroughly washed to remove any adhering materials. If desired, they are sterilized with a germicide such as hypochlorous acid and further washed fully with water. Further, the washed material is sliced to be any proper size. Where slicing the material, the resultant slices may be used by immersing them in a dilute (for example 0.1–2.0%) saline solution) and then removing water. Further, at any optional stage of this pretreatment the following treatment may be made, i.e. a blanching treatment is conducted for 2–10 seconds or so at temperatures of 100° to 140° C. at ordinary pressure (optionally at reduced or elevated pressure) and then a rapid cooling treatment. This treatment serves to inactivate enzymes (for example, chlorophylase, peroxidase, polyphenoloxidase, etc.) which may constitute one cause of the undesirable discoloration, degeneration of the green plant, etc.

The so pretreated green plant is squeezed after adding a suitable amount of water thereby to extract a juice. This juice extraction can be easily performed in the way already known per se by combining any mechanical pulverization means like mixer or juicer with any means for liquid-solid separation such as centrifugal separation or filtration, pulverizing any edible green plant and then separating coarse solid matters from the pulverized product. In the so obtained green juice of the edible green plant its liquid quality is adjusted to be a pH of 6–9.5, preferably a range of 6.5–8.5, more preferably a range of 6.5–7.5 in accordance with the present invention by using a water-soluble alkaline natural mineral mixture.

The water-soluble alkaline natural mineral mixture used according to the present invention can be a water-soluble, alkaline extract containing a mineral mixture derived from the above starting material which is obtainable by heating naturally occurring mineral raw materials contained in seaweeds, the body of any plant or its leaf portion, a whole of any animal individual or its skelton at temperatures of about 300° to 1000° C., preferably about 450° to 700° C. to make them into an ash and extracting its ashed product with water or an aqueous acid solution. Especially, this is suitably a water-soluble alkaline extract obtained from an ashed product of the seaweeds.

Thus, examples of the seaweeds available may include various kelps (Laminaria), an edible seaweed (*Eisenia bicyclis*), wakameseaweed (*Undaria pinnatifida*), kajimeseaweed (*Ecklonia cava*), a sea lentil (*Sargasum fulvellum*), a kind of brown algae (*Hijikia fusiforme*), *Eucheuma muricatum*, giant kelp, etc. Ashes obtained by ashing these seaweeds are extracted with water or an aqueous acid solution. At the time of this extraction can be used a process which is already known per se or processes disclosed in the following official gazettes can be utilized, for instance, i.e. Japanese Laid-Open (kokai) Patent Publns. Nos. 48-87046, 51-121562, 51-121563, etc. Examples of the extracts from such seaweed ashes may include an extracted solution obtained by extracting an ashed product of red algae belonging to Cigartinales of Florideophycidae disclosed in Japanese Laid-Open (kokai) Patent Publn. No. 51-121563 with an aqueous extracting agent like water or an aqueous acid solution or its dried product; an extracted solution of the seaweed ash obtained by extracting an ashed product of any optional seaweeds covering the whole range of edible seaweeds such as green algae, brown algae or red algae other than the above examples with an aqueous acid solution or its dried product as disclosed in Japanese Laid-Open (kokai) Patent Publn. No. 51-121562; an extracted solution of the seaweed ash obtained by extracting an ashed product of any optional seaweeds covering the whole range of edible seaweeds such as green algae, brown algae or red algae with an aqueous acid solution or its dried product; an extracted solution obtained by combining an alkaline extracted solution formed at the time of water-extracting a seaweed ash with an acidic extracted solution obtained by water-extracting a water-insoluble residue formed at the time of this water-extraction under acidic conditions of pH 5.0 or less after adjusting the pH of one of these extracted solutions or the pH of both of these solutions to be in a range of 5.0 to 9.0 and then drying the extract as required or its dried product as disclosed in Japanese Laid-Open (kokai) Patent Publn. No. 48-87046; etc. The above extracts of the seaweed ashes show a strong alkalinity usually of pH 9.0 or more, mostly a range of pH 10–12 and contain a variety of useful minerals contained in seaweeds comprehensively and collectively. Moreover, the above extracts exhibit strong buffer properties at the time of their neutralization with an acid. Thus, they proved to be very suitable as a pH controlling agent for the green juice in the present invention.

The above water-soluble alkaline naturally occurring mineral mixture is added to the raw green juice of the above plant for making the pH adjustment of said raw green juice. Where using the above extract of seaweed ashes, this may be added in the form of an extracted solution or in the form of its dried product. Its amount added is such as adjusting the pH of the raw green juice to be within a range of pH 9.5 preferably pH 6.5–8.5, more preferably pH 6.5–7.5.

The raw green juice which pH was so adjusted may be subjected to the drying step directly. However, various auxiliary ingredients as stated below can be incorporated before subjecting the green juice to the drying step or optionally before making the pH adjustment according to the use of the resultant powders of green juice, etc. That is:

(1) A dried powder (including those obtained by age-treating coarse solid matters of fibrous material with dilute acids beforehand and then drying them) of plant fibrous material such as a residue of fibrous material formed after squeezing the above green plant, a residue formed at the time of extracting a fruit juice, a residue formed at the time of squeezing a sugar cane, a residue formed at the time of squeezing vegetables, or water-soluble polysaccharides or mucopolysaccharides obtainable by decomposing these plant fibrous materials with a decomposition enzyme like cellulase.

(2) Lignin sulfonate obtained by decomposing wood chips, a pulp, a saw dust, rice hulls, de-fatted embryo buds, etc. with sodium sulfite or an alkali agent (e.g. caustic soda) to be water-soluble and salts thereof.

(3) A water-extracted product of the water-solubilized matters such as skeltons or cartilages of animals, fishes or the like, condroitin sulfuric acid, heparin, etc.

(4) A fatty-containing emulsion consisting mainly of protein, an emulsion such as cow milk, soybean milk, dry milk or defatted milk and an emulsion consisting of a proper combination of these fats.

(5) Phosphoric acid salts or polyphosphoric acid salts such as ammonium phosphate, diammonium phosphate, potassium phosphate, dipotassium phosphate, tripotassium phosphate, preferably sodium phosphate, disodium phosphate, trisodium phosphate, sodium polyphosphate, sodium metaphosphate, sodium pyrophosphate, potassium polyphosphate, potassium metaphosphate potassium pyrophosphate, etc.

(6) Nutritive agents such as ascorbic acid, biotin, calcium pantothenate, carotene, chlorinated choline, magnesium oxide, niacin, chlorinated pyridoxine, riboflavin sodium pantothenate, thiamine hydrochloride, tocopherol, vitamin A, vitamin $B_{12}$, vitamin $D_2$ and the like; masking agents such as sodium metaphosphate, sodium phosphate (primary, secondary and tertiary salts), sodium pyrophosphate, sodium tripolyphosphate and the like; thickeners such as gum arabic, tragacanth, sodium alginate, methyl cellulose, carboxylmethyl cellulose, calcium alginate and the like; solidification inhibitors such as calcium aluminum silicate or calcium silcate; and preservatives such as sorbic calcium, benzoic acid, paraoxymethyl benzoate, sodium benzoate and the like.

(7) Others:, mannitol, sorbitol, lactose, soluble starch, amino acids, dextrose, fruit sugar, dextrin, cyclodextrin, polydextrose and the like.

Further, in the plant green juice treated by the process of the present invention undesirable enzymes pertaining in the discoloration and degeneration can be decomposed or inactivated, and at the same time, the sterilization of bacteria having a possibility to get mixed can also be performed by instantaneously heat treating the green juice in any optional stage after the extraction of green juice but before the drying treatment. This treatment can be performed at normal, reduced or elevated pressures. For example, conditions such as treatment temperatures of 90° to 150° C. and treatment time of the order of 180 seconds to 2 seconds according to heating temperatures. After this treatment, it is desirable to cool the juice rapidly especially at a temperature not higher than 10° C.

As above, the plant green juice which pH was adjusted according to the process of the present invention is spray-dried or lyophilyzed as rapidly as possible. The spray drying or lyophylizing operation can be effected in the way already known per se.

For instance, at the time of spray-drying the juice can be spray dried by heating with a hot air at temperatures of the order of 120° to 200° C., preferably at temperatures of the order of 140° to 170° C. or at room temperature using a dry air desicated by a suitable desiccant such as lithium chloride. Further, at the time of lyophylizing are usually employed conditions of a dry plate such as a temperature of 40° to 50° C. and a vacumm of the order of 1.0 to 0.01 mm Hg.

Moreover, the concentration of green juice to be subjected to a drying step is in a range of the order of 1.5 to 30% and is desirably as high as possible. Therefore, for concentrating the green juice continuous film concentrating devices, vacuum concentrating devices, etc. can be utilized. Further, at the time of working the process of the present invention, if desired, discoloration and degeneration of plant green juice like green juice extracted from green leaves of wheat and barley during transportation or storage can be prevented until it is subjected to a drying step, by the steps, used either alone or in combination, of replacing air with an inert gas such as nitrogen or argon, sealing an oxygen absorbent such as glucoseoxidase, maintaining it at cold temperatures and shutting off light.

In the above drying step there is some case where a low-boiling-point organic acid in the green juice or the like disappears and the pH at the time of dissolving the resultant powder in water usually somewhat increases depending on the drying conditions. Thus, said pH may usually fall into a range of 6.2 to 9.5.

In accordance with the above-mentioned process it is possible to produce powders of plant green juice comprising:

(a) dry powders of the plant green juice obtained by squeezing fresh raw green edible plants, and (b) an alkaline naturally occurring mineral mixture dispersed[uniformly in said dry powder, preferably water-extracted matters of seaweed ashes, and the pH of a dispersion at the time of dispersing in water being within a range of 6–9.5, preferably 6.5–8.5, especially preferably 6.5–7.5.

The green juice provided by the present invention can aim at an increase in the flavor and taste of powders of the green juice obtained by using a water-soluble alkaline naturally occurring mineral mixture, especially water-extracted matters of seaweed ashes as a pH controlling agent, said increase in the flavor and taste of powders being quite unattainable by the use of hitherto used chemical alkaline agents such as sodium carbonate or calcium hydroxide. Thus, the green juice of the present invention is very rich in tastiness. Moreover, this green juice has a notably excellent stability, compared with powders of green juice produced by the above conventional method. The green juice of the invention can maintain an inherent green color of the juice even if stored for a long period of time, e.g. 3 to 4 years. Thus, the green powders of the invention can be offered for drinking directly or after blending with water, warm water, plain soda, cider, cow milk or other beverages. Further, the above green powders can be used by incorporating them in various foodstuffs as food additives. Moreover, they contain not only a wide variety of useful minerals abundantly to be introduced by an alkaline naturally occurring mineral mixture which is added in addition to vitamins and minerals derived from the starting plants but also an essential fatty acid and any other substance having a medicinal effect. They can be utilized effectively in the field of the drugs.

If desired, table salt, sugar, bee honey, glucose and other seasonings or spices can also be incorporated appropriately in the powders of the plant green juice of the invention. Examples of other additives incorporated may include vitamins, antioxidants such as d-isoascrobic acid, 1-isoascrobic acid, propyl gallate, butyl hydroxy anisole or butyl hydroxy toluene, food antiseptics such as dehydroacetic acid and its sodium salt, or benzoic acid and its sodium salt, and emulsifiers such as sucrose fatty acid esters or sorbitan fatty acid esters. The plant green juice of the invention can be formed into granules, pellets, coated tablets, capsules and other various forms.

The present invention will be explained more concretely by way of the following examples.

EXAMPLE 1

Fresh green leaves of barley were reaped and its 10 Kg was thoroughly washed. The above green leaves were washed well with a liquid of a commercially available cleaner for foods dissolved in a suitable amount of water, dehydrated and pulverized by means of a mixer. By squeezing the green leaves were produced nine liters of green juice (pH of 6.4, containing 410 g of a dried product of the extract). Separately, a dry kelp was made into an ash at 600° C., watered and extracted thereby to prepare a water-extracted solution of the kelp ash. The resultant water-extracted solution was added to the above green juice thereby to neutralize the juice to a pH 7.0. Then its spray-drying was conducted at a blowing temperature of 170° C. to produce 405 g of an object green juice powder (yield of about 97%).

EXAMPLE 2

A total (10 kg) of two kilograms of fresh green leaves of barley, two kilograms of fresh green leaves of wheat, two kilograms of fresh green leaves of rye, two kilograms of spinach, one kilogram of Chinese cabbage and one kilogram of cabbage were washed well in water and squeezed with a juicer thereby to produce 9.5 liters of green juice (pH of 6.3, containing 450 g of a dried product of the extract). While, Eucheuma, one kind of red algae, was dried and made into an ash at 550° C. Water-souble components were extracted thereby to prepare an aqueous strongly alkaline naturally occurring mineral solution of pH 11.2. Using this aqueous solution 9.5 liters of the above green juice was neutralized to be a pH 7.2 and this was concentrated[to be three liters by means of a continuous concentrating device. To the concentrate were added 400 g of dextrin and 400 g of lactose. Moreover, 400 g of a water-soluble fiber was added to the mixture, said water-soluble fiber being obtained by adding cellulase to a residue of fibrous material formed after squeezing an orange juice and decomposing it enzymatically. The resultant aqueous mixture was spray-dried thereby to produce 1,460 g of an object green juice powder.

EXAMPLE 3

A total (10 kg) of one kilogram of green pepper, one kilogram of cucumber, one kilogram of celery, one kilogram of leaves of carrot, two kilograms of spinach and four kilograms of green leaves of barley were washed well in water and extracted with a squeezer thereby to produce 9.5 liters of green juice (pH of 6.1, containing 415 g of a dried product of the extract). Separately, a dry kelp was made into an ash at 600° C., watered and extracted thereby to prepare an aqueous strongly alkaline naturally occurring mineral solution. To the above green juice was added this aqueous alkaline solution thereby to adjust the pH of the juice to be 6.9. Successively, 400 g of cyclodextrin, 200 g of lactose, 200 g of defatted milk, 100 g of gum arabic powder and 400 g of powders of synthetic water-soluble fiber were added to the juice, followed by mixing them and solving the mixture. The resultant mixture was spray-dried thereby to produce 1,630 g of an object green juice powder.

EXAMPLE 4

As in the above Example 1 an aqueous strongly alkaline naturally occurring mineral solution (pH of 11.0) obtained by water extracting water-soluble components in rice hulls made into an ash at 500° C. was added to 4.6 liters of green juice (pH of 6.3, containing 210 g of a dried product of the extract) obtained from 5 kg of green leaves of barley thereby to adjust the pH of the green juice to be 7.0. Separately, 100 g of lignin sodium sulfonate obtained by decomposition solubilizing wood chips with sodium sulfite, 200 g of dextrin and 100 g of dry powders of Chinese cabbage were added to the juice and mixed. The resultant mixture was spray-dried thereby to produce 560 g of an object green juice powder.

EXAMPLE 5

Five kilograms of Chinese cabbage and five kilograms of spinach were washed well in water, pulverized with a mixer and squeezed to produce nine liters of green juice (pH of 6.3, containing 210 g of a dried product of the extract). To this were added 450 g of lactose and 450 g of cyclodextrin, followed by mixing them and solving the mixture. To this mixture was added an aqueous alkaline naturally occurring mineral solution obtained by carbonizing an oak wood at 800° C. to produce 1.5 kg of a carbide and then eluting minerals in the carbide with five liters of water thereby to adjust its pH to be 7.0, As in Example 1 the resultant mixture was spray-dried thereby to produce 1,250 g of an object vegetable green juice powder.

EXAMPLE 6

Five kilograms of spinach and five kilograms of green pepper were extracted with a squeezer thereby to produce nine liters of green juice (pH of 6.1, containing 470 g of a dried product of the extract). To this green juice was added an aqueous alkaline naturally occurring mineral solution having a pH of 11.2 obtained by carbonizing a dry kelp at 700° C. and then adding water to elute minerals in the kelp and the pH of the green juice was adjusted to be 7.2. Successively, 100 g of glucose, 50 g of bee honey, 470 g of dextrin, 235 g of defatted milk and 200 g of water-soluble components (mainly water-soluble cellulose) obtainable by boil-sterilizing a mushroom, then adding cellulose to this at 35° C. for five hours and then decompositon solubilizng the mixture were mixed and solved. To the resultant mixture were added one gram of vitamin E and five grams of vitamin C. The green juice was further neutralized to be 7.0 with the above aqueous alkaline naturally occurring mineral solution and was lyophylized thereby to produce 1,380 g of an object vagetable powder.

Storage Stability Testing of Green Juice Powders

As to the storage stability of green juice powders obtained by the above Examples 1–6 the content of chlorophill was determined in accordance with the following method.

Determination method of chlorophyll

By weighing one gram of a sample 30 ml of 85% acetone is added to the sample. After conducting a supersonic extraction the liquid is allowed to stand and the resultant supernatant is transferred to a beaker. The same operation is repeated until the liquid would not get colored any longer. Whereby the supernatant is collected. The extracted solution is collected. The extracted solution is transferred to a separatory funnel in which 50 ml of ethyl ether is put beforehand and 50 ml of 5% sodium sulfate is added to the funnel. Then the funnel is shaked gently thereby to discharge an aqueous phase. An anhydrous sodium sulfate is added to the funnel and the mixture is dehydrated and filtered. Then ethyl ether is added to the filtrate thereby to bring its total amount to 100 ml exactly. This is used as a sample solution. This sample solution is determined as to the absorbance at 660 nm and 642.5 nm. And the overall chlorophyll content is calculated in accordance with the following formula:

$$\text{Overall chlorophyll (mg/l)} = 7.12 \times A_{660} + 16.8 \times A_{642.5}$$

The results obtained are shown in Table 1 below.

TABLE 1

| Example | Overall chlorophyll content in 100 g | Change in the overall chlorophyll content in 100 g in the storage testing (4° C.) | | pH at the time of dissolving 2 g of the sample in 100 ml of distilled water after two years from production |
|---|---|---|---|---|
| | | After one year | After two years | |
| 1 | 1450 mg | 1420 mg | 1305 mg | pH 7.2 |
| 2 | 290 mg | 284 mg | 275 mg | pH 7.2 |
| 3 | 261 mg | 253 mg | 245 mg | pH 7.3 |
| 4 | 478 mg | 454 mg | 445 mg | pH 7.1 |
| 5 | 295 mg | 282 mg | 274 mg | pH 7.1 |
| 6 | 246 mg | 233 mg | 231 mg | pH 7.0 |

Tastiness Testing of Green Juice Powders

Three grams of the green juice powder obtained by Example 3 was dissolved in 150 ml of water. And tastiness evaluation testing of the green juice powder was conducted by letting 25 women and 20 men drink the juice.

A comparison of the tastiness was made using a solution of 3 g of the green juice powder obtained by Example 3 dissolved in 150 ml of water and the green juice powder produced by adjusting the green juice to be neutral with $Na_2CO_3$ and NaOH instead of a naturally occurring mineral mixture in the process of Example 3. The results obtained are shown in Table 2 below.

TABLE 2

| | The green juice is fresh, slight and easy to drink | The green juice has a bad smell and hard to drink | The green juice has a soap smell and taste |
|---|---|---|---|
| When adjusting the green juice to be neutral with a naturally occurring mineral (45 persons) | 43 persons | 2 persons | No person |
| When adjusting the green juice to be neutral with $Na_2CO_3$ (45 persons) | 15 persons | 20 persons | 10 persons |
| When adjusting the green juice to be neutral with NaOH (45 persons) | 7 persons | 25 persons | 13 persons |

What is claimed:

1. Powders of plant green juice which are storable having an improved stability and tastiness, said powders comprising:
    (a) dry powders of plant green juice of fresh raw edible green plants selected from the group consisting of barley, wheat, naked barley, oat and Italian rye grass, and
    (b) a water-soluble alkaline extract of an ashed product of seaweeds, dispersed uniformly in said dry powders (a), and
    when the powders comprised of (a) and (b) are dispersed in water, the pH of the resulting dispersion falls into a range of 6.5–8.5.

2. The powders of plant green juice according to claim 1 wherein the water-soluble alkaline extract is obtained by ashing seaweeds at temperatures of about 300° to 1,000° C. and extracting the ash with water or an aqueous acid solution.

3. The powders of plant green juice according to claim 1 wherein said extract exhibits an alkalinity of pH 10–12.

4. A process for the production of powders of plant green juice which are storable having an improved stability and tastiness, comprising
    squeezing fresh raw edible green plants selected from the group consisting of barley, wheat, naked barley, oat and Italian rye grass to produce a plant green juice;
    adding a water-soluble alkaline extract of an ashed product of seaweeds to said plant green juice to adjust the pH of said plant green juice to be in a range of 6.5–8.5; and
    then, spray-drying or lyophilizing the so-formed green juice admixture.

5. The process according to claim 4 wherein the water-soluble alkaline extract is obtained by ashing seaweeds at temperatures of about 300° to about 1,000° C. and extracting the ash with water or an aqueous acid solution.

6. The process according to claim 4 wherein said plant green juice is subjected to a heating treatment before drying.

7. The process according to claim 6 wherein said plant green juice is treated at 90° to 150° C. for 180 to 2 seconds.

* * * * *